Nov. 4, 1924.

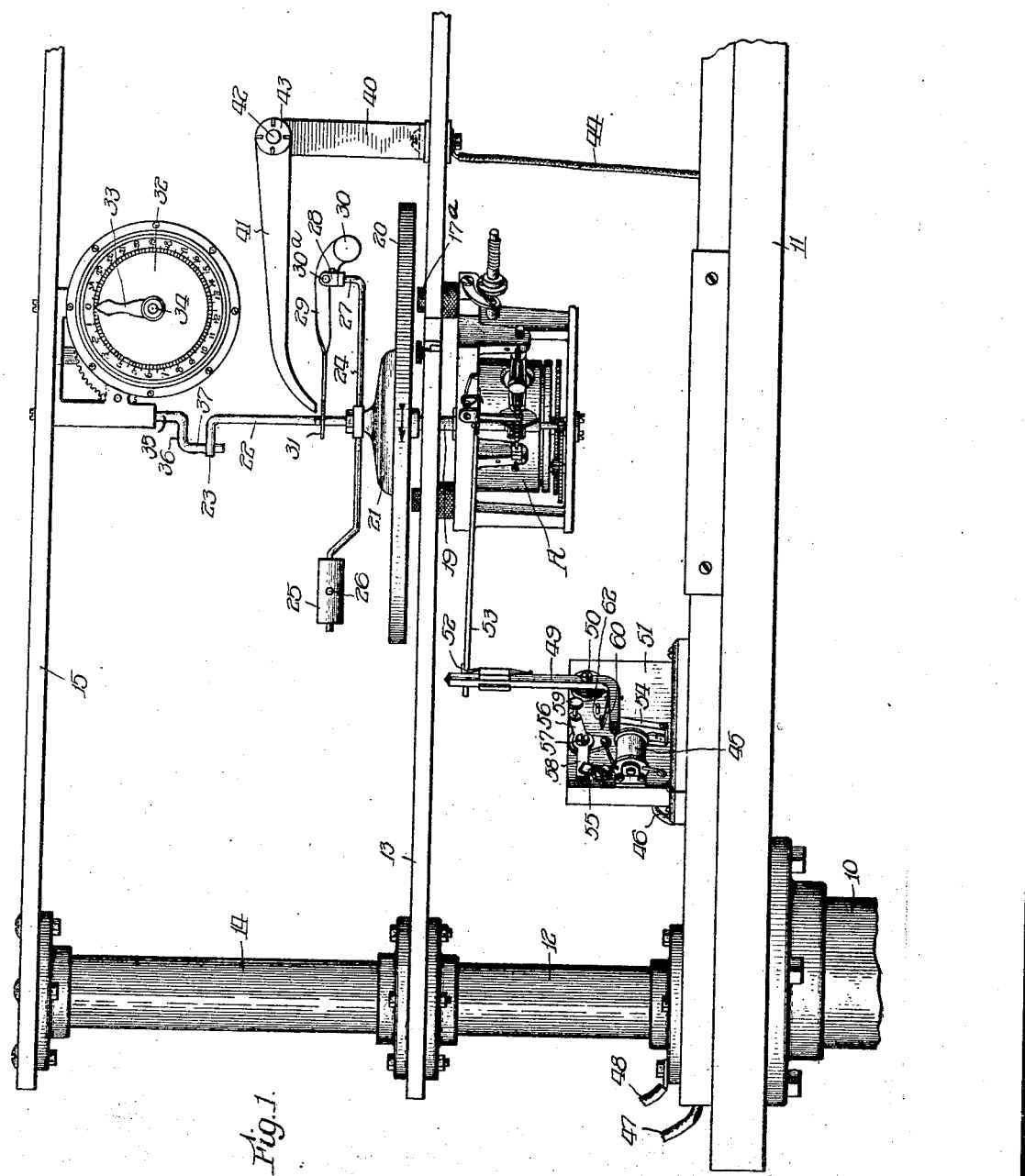

G. E. ROEDDING ET AL 1,514,343

SPRING MOTOR TESTING DEVICE

Filed Feb. 2, 1921

Inventors:
Gordon E. Roedding
Fred H. Doerr,
By Williamson, Huxley, Byrne & Knight
Attys Witness:
A. J. Sauser Nov. 4, 1924.  1,514,343

G. E. ROEDDING ET AL

SPRING MOTOR TESTING DEVICE

Filed Feb. 2, 1921   3 Sheets-Sheet 3

Witness:
A. J. Sauser

Inventors:
Gordon E. Roedding
Fred H. Doerr
By Wilkinson, Huxley, Byron & Knight
Attys.

Patented Nov. 4, 1924.

1,514,343

UNITED STATES PATENT OFFICE.

GORDON E. ROEDDING AND FRED H. DOERR, OF GRAND RAPIDS, MICHIGAN, ASSIGNORS TO CHENEY TALKING MACHINE COMPANY, OF CHICAGO, ILLINOIS, A CORPORATION OF ILLINOIS.

SPRING-MOTOR-TESTING DEVICE.

Application filed February 2, 1921. Serial No. 441,748.

*To all whom it may concern:*

Be it known that we, GORDON E. ROEDDING and FRED H. DOERR, the former a citizen of the Dominion of Canada, and the latter a citizen of the United States, and both residing at Grand Rapids, in the county of Kent and State of Michigan, have invented certain new and useful Improvements in Spring-Motor-Testing Devices, of which the following is a specification.

This invention relates to a method of and apparatus for testing speed of spring motors for sound reproducing machines.

In the manufacture of talking machines operated by spring motors, it is desirable to test and regulate the speed of the motors without having to install the motors in the talking machine cabinets. When completed a spring motor must be tested while running at 80 revolutions per minute which is the standard speed for the reproduction of records. This operating speed must not fluctuate more than 2 revolutions per minute and must run as many operating speed minutes as specified in accordance with the capacity of the motor.

The present practice is to test the motors to run at a normal speed of 80 revolutions per minute, which has been found to be the speed best suited for efficient operation of the motors and consequent sound reproduction.

In quantity manufacture of spring motors, no means have been found whereby a large number of motors may be tested quickly, accurately and with a minimum of expense. The usual means of testing is to fix a motor to a talking machine cabinet and operate the same under actual conditions. This practice of course is slow, tedious and expensive.

Our invention is directed to a means for and method of testing spring motors whereby a plurality of motors may be tested at one time by a single operator and under conditions which are like the actual conditions found in a sound reproducing machine.

An object of our invention is to provide a method of testing spring motors for proper speed regulation without having to install the motor in a talking machine cabinet.

Another object is to provide an apparatus for testing a plurality of spring motors whereby the speeds of the same may be adjusted within certain limits.

A further object of our invention is to provide a means of accurately testing a plurality of spring motors efficiently, quickly and with a minimum of expense.

A still further object is to improve means for testing spring motors in large quantities for successful commercial purposes.

Generally speaking, in carrying out our invention, we provide a framework adaptable for the reception of a plurality of spring motors. The motors are removably positioned in the framework whereupon record tables are mounted on the motor spindles and a portion of the testing apparatus placed on the tables. The weight of the testing apparatus placed on the tables is such that when the motors are operated, resistances are applied to the motors which are equal to the resistance under actual playing conditions. In connection with the portion mounted on the record table, means are provided which under certain conditions of speed fluctuations are caused to set the brake in the motors.

The various novel features of our invention will be clearly described in the following specification and drawings and particularly pointed out in the appended claims.

In the accompanying drawings,—

Figure 1 is a partial side elevation of a frame constructed in accordance with our invention, showing a single motor mounted therein for testing purposes;

Figure 4:
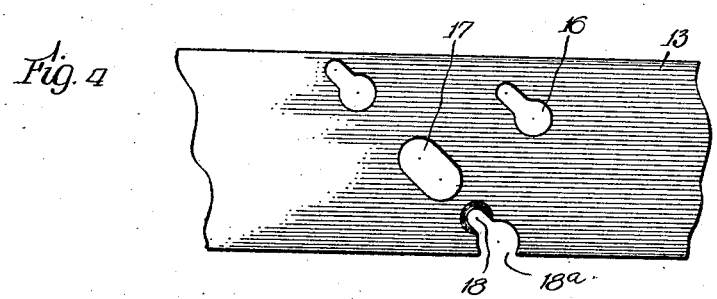
Figure 4 is a plan view of a fragmentary portion of the framework showing elongated slots for temporary suspension of the spring motor therein.
Figure 6:
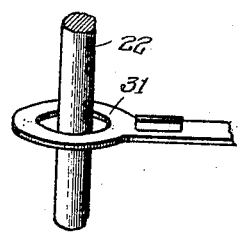
Figure 6 is a view showing a detail of construction.

The framework comprises supports 10 which are mounted on a floor or other surface and carry a plank 11. Projecting upwardly from the plank 11 are other supports 12 carrying an intermediate plate 13 and upwardly from plate 13 are still other supports 14 carrying top plates 15. Preferably the framework, with possibly the exception of the member 11, is made of metal. At intervals throughout the length of the member 13 there are provided elongated slots shown clearly in Figure 4. These slots are provided with enlarged portions 16 for the reception of the knurled ends of the screws 17$^a$ which support the spring motor A in position in the testing apparatus while slot 18 has the enlarged edgewise opening part 18$^a$ for a like purpose, to be referred to hereinafter. The elongated slot 17 is arranged to receive the spindle 19 for the spring motor. The purpose of the slots is to removably position the spring motor A therein without having to remove the fastening screws 17$^a$ from the motor. After the motor has been moved laterally so that the heads of the screws overlie the reduced portions of the slots, the motor is secured in position for testing purposes by screwing down the screw in the slot 18 which slot has beveled edges as shown and with which the correspondingly beveled under surface of the screw head cooperates. When the motor has been so positioned, a record table 20 of commercial size and weight is applied to the exposed end of the spindle 19. Placed on the table 20 is a member 21 which consists of a weighted base having an upwardly extending stem 22 with its upper end 23 bent at an angle of approximately 90 degrees. Extending transversely of the stem 22 and just above the base is a horizontal arm 24 carrying at one end a weight 25 which is adjustable by means of a set screw or similar means 26 on a portion of the length of the member 24, and with the other end upturned as at 27 and carrying a bifurcated jaw 28 in which is mounted an arm 29, moving about a horizontal pivot 30$^a$. The arm 29 has a weight 30 at one end and a flattened circular portion 31 at the other end, the construction of which is best seen in Figure 6. The end 31 of this arm, as will be observed, encircles the stem 22 and is large enough to have movement relatively thereto without binding.

Figure 3:
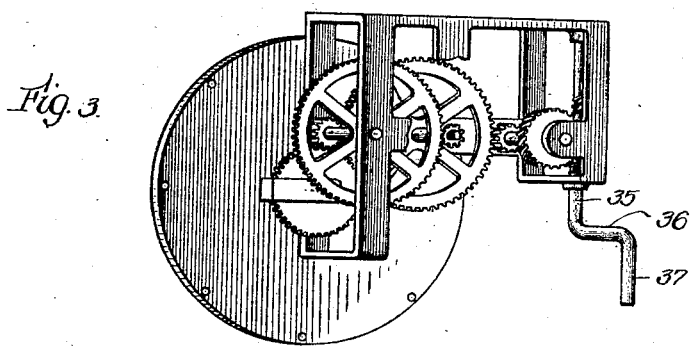
Figure 3 is an enlarged view of the reduction gearing for the time indicator.

Mounted on the under side of the top plate 15 is a dial 32 having figures arranged about the same. This dial is for the purpose of indicating the length of time that the spring motor A runs, as will be hereinafter more fully described. The indicator carries a pointer arm 33 frictionally supported on a shaft 34 which is caused to rotate through means of reduction gearing shown in Figure 3 by a vertical shaft 35, the lower end of which shaft is bent outwardly and downwardly as at 36 and 37, the parts being arranged so that the downwardly extending portion 37 will be engaged by the L-shaped end 23 of the member 22 so that as the record is caused to rotate by the spring motor, the pointer 33 in the time mechanism may be rotated also.

It will be observed that as the table 20 is rotated by the motor A, the arm 24 is rotated, carrying with it the pivoted arm 29. By reason of the weight 30 and the construction of the parts, the end 31 of the arm 29 will rise and fall according to the variation in speed of the record table 20. This variation may be indicated by means of a number of lines 38 and 39 suitably marked on spindle 22, the lower mark 39 and the upper mark 38 being spaced apart a sufficient distance so that the fluctuation of not over two revolutions per minute will hold the end 31 of the arm 29 within the space defined by these marks and any further fluctuation in the speed will cause the end to move above or below the marks 38 or 39, as the case may be.

Supported on the intermediate plate 13 is an upright standard 40 having a laterally extending arm or finger 41 which is secured to the support 40 by means of a friction joint 42. This joint may consist of a plurality of spring disks 43 cooperating with a screw so that relative adjustment of the member 41 with respect to its support 40 may be made. The end of the arm or finger 41 near the spindle 42 is preferably bent downwardly so as to be contacted by the arm 29 as the same rises as the speed of the member A slackens. In the form of the invention shown in Figure 1, the arm 40 is, by means of a conductor 44, in electrical communication with a magnet 45, the other side of which is connected by means of a conductor 46 with conductors 47 and 48 in communication with some source of electrical power such as a battery B. The magnet 45 controls an upstanding finger 49 which is pivoted at 50 to an upright plate 51 suitably secured in the lower plank 11 of the frame. The upper end of the arm 49 carries an L-shaped finger or latch 52 which normally latches with the arm 53 controlling the brake of the motor A. The latch is slidable on the arm 49 so as to be positioned vertically to adjust the speeding motor to exactly 80 R. P. M. This condition holds true with respect to the latch 68 on rod 40$^a$ of Figure 5. The brake, being a well-known type, is not described in detail, the brake lever in the present instance being the same as that used to move the brake into and out of braking position by well known means which are installed in sound reproducing machines.

Figure 2:
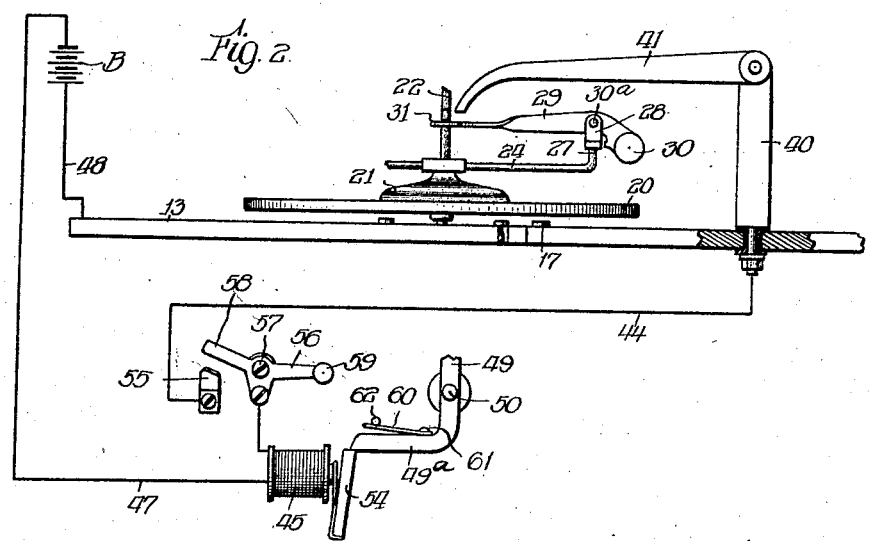
Figure 2 is a schematic drawing of the electrical circuit adapted for actuating the brake and tripping mechanism.

Referring to Figures 1 and 2 of the drawings, the operation of the electric brake control will be more readily observed.

The lower end of the arm 49 is inturned, forming a foot 49$^a$ which, with the arm 49, is in latching position as shown in Figure 1 and is supported from below by the armature 54 influenced by the magnet 45 under certain conditions. A conductor 49 is connected to a binding post 55. A movable switch element 56 is pivoted at 57 to the support 51 and has one member 58 adapted to engage the contact 55 under certain conditions, and has another member 59 which serves as a handle for moving the switch and also adapted to be contacted by the arm 49 under certain conditions. When the magnet 45 is deenergized a spring 54$^a$ on the armature 54 causes the armature to move into position under the arm 49$^a$ whenever the arm 49$^a$ is raised.

The operation of the device is as follows—

The spring motor A having been removably applied to the slotted portions of the intermediate plate 13, and the record table and other portions of the testing device having been applied, the motor is set in operation. It may be stated here that when the spring motor is presented for testing purposes it has already been wound, so that it is ready for actual working conditions. The motors are then adjusted by movement of either latch 52 or 68, to rotate at approximately the required speed, which is 80 revolutions per minute. Therefore, when a motor under test is started the switch 56 is not closed until the motor is up to its speed of 80 revolutions per minute, which may be indicated by the position of the end 31 of the arm 29 of the indicating device, with respect to the marks 38 and 39 on the stem 22. When 80 revolutions per minute have been made, the switch is closed. Now if the speed of the motor diminishes more than two revolutions per minute, the end 31 of the arm 29 will rise and contact the downwardly extending end of the finger 41, whereupon an electrical circuit through the magnet 45 is closed energizing the magnet 45. Immediately the armature 54 of the magnet is attracted, removing the support from the toe of the arm 49$^a$. This being an unbalanced arm will fall in a counter-clock-wise direction, as viewed in Figures 1 and 2. As an aid to moving the arm in this direction a spring 60 is secured at 61 to said arm and when the arm is in position as shown in Figure 1, the spring presses against a pin 62 so that as the armature 54 is withdrawn the spring 60 will aid in detaching the hook 52 from engagement with the brake lever 53. The parts are so arranged that when the arm 49 falls it will fall on the member 59 of the switch 56, thus breaking the circuit through the magnet. As soon as the arm 49 moves in such manner as to cause disengagement between the hook 52 and the brake lever 53, the motor and its associated parts immediately come to rest. The pointer 33 of the time indicator will then show how many minutes the motor has been in operation.

Figure 5:
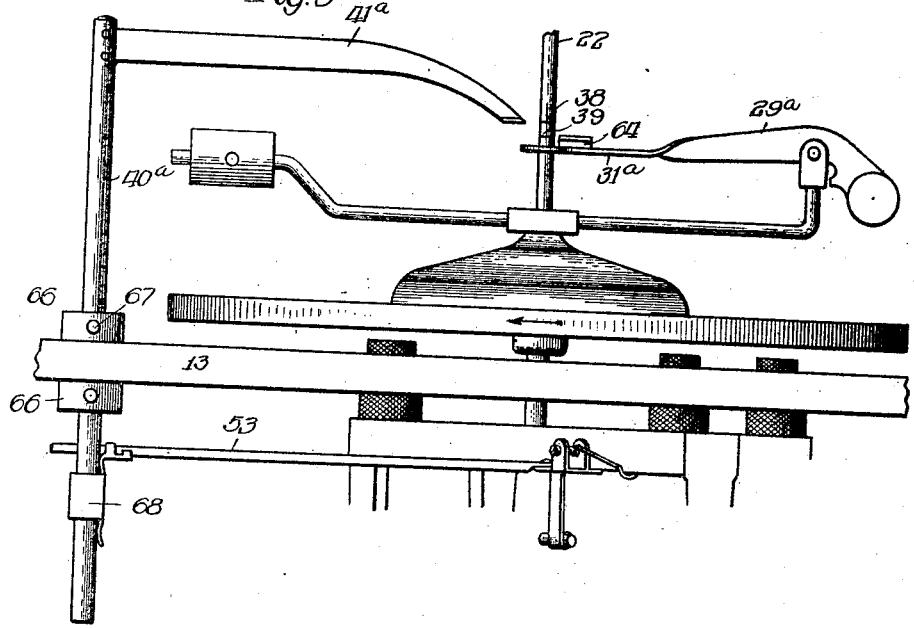
Figure 5 is a view similar to Figure 1 showing a mechanical brake release.
Figure 7:
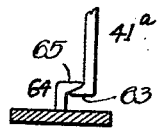
Figure 7 is another detail view of construction.

The form of the invention shown in Figure 5 discloses a mechanical trip rather than an electrical trip. In this form of the invention, the motor, spindle and turn table are similar to the form shown in Figure 1, with the exception that the end of the finger 41 is bent laterally forming a hook, as shown at 63 in Figure 7, and the end 31$^a$ of the arm 29$^a$ has an upstanding catch 64 thereon with a laterally bent portion 65 adapted to hook over the end 63 of the arm 41$^a$. This engagement is shown in Figure 7.

The operation of the device as shown in Figure 5 is identical with the operation of the device shown in the other figures of the drawings, but instead of establishing electrical circuit when the arm 29$^a$ rises, the hooks 63 and 65 engage, causing a lateral or swinging movement of the arm 41$^a$. This arm 41$^a$ is supported on a shaft 40$^a$ adapted for rotative movement in the intermediate frame member 13. The vertical position of the shaft or member 40$^a$ is adjusted by means of collars 66 positioned on the member 40$^a$ by set screws or similar fastening elements 67. Below the intermediate frame member 13 the shaft or member 40$^a$ carries a trigger 68 which engages the brake arm 53 of the motor brake in a manner similar to that of the catch 52 on the arm 49 of the arrangement shown in Figure 1 of the drawings. In this form therefore, as the speed of the motor falls below the predetermined two revolutions per minute, the hooks 63 and 65 engage the arm 41$^a$ turning it and its connected shaft and likewise the trigger 68 in such direction as to free the brake lever 53, whereupon the motor and its associated parts come to rest.

We have found that with our device it is possible to so arrange the parts that a single operator may inspect 16 motors at one time, as it will be observed that if any motor fluctuates more than two revolutions per minute from the standard speed of 80 revolutions per minute, that particular motor may be automatically caused to stop and the length of time it has run before stopping will be indicated on the time indicator 32.

It will be observed that our invention is adaptable for testing spring motors without the application of the motors to a talking machine cabinet. The test to which the motors inspected in accordance with our invention are subjected is exactly the same as experienced in reproducing positions.

The index or pointer 33 of the time indicator is frictionally mounted so that the same may be moved back to zero after having been stopped by a previous operation.

While we have described more or less precisely the details of construction of our invention, we do not wish to be understood as limiting ourselves thereto, as we contemplate changes in form and the proportion of parts and substitution of equivalents as circumstances may suggest or render expedient, without departing from the spirit of our invention.

We claim:

1. A device for testing the speed of motors, including a shaft adapted to be driven by the motor under test, a brake for said motor, and operating means for said brake, operative to set said brake when the speed of said motor falls below a predetermined rate.

2. In a device for testing the speed of motors, a shaft adapted to be driven by the motor under test, a brake for said motor for preventing excessive speed of said motor, and centrifugally operated means controlled by said motor for setting said brake to stop said motor upon the occurrence of a predetermined low motor speed.

3. In a device of the class described, in combination, a record table, a motor for driving said record table, a brake for said motor, latching means for maintaining said brake in non-braking position, and centrifugally controlled means responsive to the speed of said motor for tripping said latching means whenever the speed of said motor falls below a predetermined limit.

4. In a device of the class described, in combination, a record table, a motor for driving said record table, a brake for said motor, latching means for maintaining said brake in non-braking position, centrifugally controlled means responsive to the speed of said motor for tripping said latching means whenever the speed of said motor falls below a predetermined limit, and means for indicating the number of revolutions of said motor prior to stopping.

5. In combination, a motor to be tested, a brake for said motor, a frame for removably mounting said motor, latch means carried in said frame for maintaining said brake in position to prevent an excessive speed of said motor, and centrifugally operated means responsive to the speed of said motor for tripping said latch means at a predetermined low motor speed.

6. In combination, a motor to be tested, a brake for said motor, a frame for removably mounting said motor, latch means carried in said frame for maintaining said brake in position to prevent an excessive speed of said motor, centrifugally operated means responsive to the speed of said motor for tripping said latch means at a predetermined low motor speed, and means for indicating the number of revolutions of said motor prior to stopping.

7. In combination, a motor to be tested, a frame for removably mounting said motor, a shaft driven by said motor, a centrifugally responsive device driven by said shaft, and electrical control means responsive to said centrifugally operated means for stopping said motor when the speed thereof drops to a predetermined point.

8. In combination, a motor to be tested, a frame for removably mounting said motor, a shaft driven by said motor, a centrifugally responsive device driven by said shaft, and electrical control means responsive to said centrifugally operated means for stopping said motor when the speed thereof drops to a predetermined point, and means driven by said shaft for indicating the number of revolutions prior to stopping.

Signed at Grand Rapids, Michigan, this 29 day of Jan. 1921.

GORDON E. ROEDDING.
FRED H. DOERR.